Dec. 30, 1969   C. GARDNER   3,486,233
CONICOGRAPH

Filed Aug. 20, 1968

Dec. 30, 1969  C. GARDNER  3,486,233
CONICOGRAPH

Filed Aug. 20, 1968  3 Sheets-Sheet 2

Dec. 30, 1969   C. GARDNER   3,486,233
CONICOGRAPH
Filed Aug. 20, 1968   3 Sheets-Sheet 3

United States Patent Office 3,486,233
Patented Dec. 30, 1969

3,486,233
CONICOGRAPH
Clayton Gardner, 37 Girard Ave., Chatham, N.J. 07928
Filed Aug. 20, 1968, Ser. No. 753,972
Int. Cl. B43l 11/02
U.S. Cl. 33—27                                   9 Claims

ABSTRACT OF THE DISCLOSURE

A device for drawing conic sections in which a transverse bar normally parallel to the directrix is caused to move away from the directrix while remaining parallel to it, simultaneously a scriber is caused to move away from a fixed focus point in such a way that the ratio of the distance moved by the scriber away from the focus point to the distance moved by the transverse bar away from the directrix is maintained constant.

---

This invention relates to a device for drawing conic sections.

It is an object of the invention to provide a device that may be adjusted to scribe any one of the conic sections, namely, a circle, an ellipse, a parabola, or a hyperbola.

A further object of the invention is to provide a device that may be adjusted not only to vary the eccentricity of the curve scribed, but also to vary the distance between the focus and vertex of the curve.

An invention having the above objectives is described by Vernon H. Gray in Patent No. 2,513,641. The invention herein described meets all of the Gray's objectives and in addition its construction is much simpler, it is easy to operate, and it is adaptable for use on an overhead projector to teach fundamental concepts of the conic sections to students of mathematics from either or both of two points of view.

The present invention is simpler than Gray's invention since in contrast to Gray's invention, it does not have a linearly movable support mounted to travel along a line . . ., with a slide mounted on the linearly movable support for linear movement transverse to said line. Instead, the present invention has a fixed support and a slide mounted for linear movement on the fixed support with a bar mounted on the slide, said bar being normally perpendicular to the line of travel of the slide and hereinafter referred to as a transverse bar. As can be seen from the disclosure that follows, the fixed support instead of a linearly movable support makes the present invention simpler and more economical to construct and also it makes the present invention easier to adjust and easier to operate. Further, it makes the present invention have considerably less thickness than Gray's invention—a feature that makes the present invention suitable for use on an overhead projector to teach fundamental concepts of the conic sections.

The present invention utilizes the following eccentricity definition of a conic section—a conic section is the locus of all points P such that the ratio of the distance of P from a fixed point F (the focus) to the distance of P from a fixed line L (the directrix) is a constant $e$ (the eccentricity). If $e$, the eccentricity, is less than one, the conic is an ellipse; if $e$ equals one, the conic is a parabola; and if $e$ is greater than one, the conic is a hyperbolt.

In accordance with the present invention, hereinafter referred to as a conicograph, a transverse bar normally parallel to a fixed line L, the directrix is caused to move away from L while reaining parallel to L. Simultaneously, a scriber is caused to move away from a fixed point F, the focus, in such a way that the ratio of the distance moved by the scriber away from F to the distance moved by the transverse bar away from L is maintained constant. A nearly nonstretchable cord, such as a dial cord or wire cable, is attached to the scriber, extends to the focus F, and then through a centrally located longitudinal bore in an adjustable focus arm that lies along a line perpendicular to L to a spool that is located well in back of the transverse bar. A second nonstretchable cord is attached at one end of the transverse bar and at the other end to a second spool located near the first spool. The two spools may be of different diameters and adjustably attached to the same spindle in which case there is a predetermined positive ratio between the diameters of the spools. The two spools may be of the same diameter and splined to different spindles in which case the spindles are externally geared to turn at a predetermined ratio to each other. In either case, the predetermined ratio is the ratio of distance the scriber moves away from the point F to the distance the transverse bar moves away from the given line L. Thus, if the predetermined positive ratio is less than one, the conicograph draws part of an ellipse, if it is one, the conicograph draws part of a parabola, and if it is greater than one, part of a hyperbola.

The predetermined ratio may be made equal to zero by fixing the spools so that they cannot turn. In this case the scriber does not move further away from the fixed point F than it was when the spools were fixed not to turn and the conicograph draws part of a circle.

A first embodiment of the conicograph also draws ellipses utilizing the following definition—an ellipse is the locus of all points P such that the sum of the distances from two fixed points $F_1$ and $F_2$ (the foci) is a constant; that is, for some positive number $2a$ and for all points P on the ellipse $F_1P + PF_2 = 2a$.

The first embodiment of the conicograph also draws hyperbolas utilizing the following definition—a hyperbola is the locus of all points P such that the positive difference of the distances from two fixed points $F_1$ and $F_2$ (the foci) is a constant; that is, for some positive number $2a$ and for all points P on the hyperbola $|PF_1 - F_2P| = 2a$.

For the latter definitions of an ellipse and a hyperbola, the first embodiment of the conicograph has two adjustable focus arms, each focus arm having a centrally located longitudinally bored hole and the innermost ends of the focus arms correspond to the foci $F_1$ and $F_2$. A scriber is rotatably attached to two cords. One cord goes to $F_1$, through the longitudinally bored hole of the first focus arm, and is wound on a spool. The second cord goes to $F_2$, through the centrally bored hole of the second focus arm, through appropriate guides to a second spool having the same diameter as the first spool. The two spools are either on the same spindle or on two spindles externally geared to turn in a one-to-one ratio. If an ellipse is desired, the second cord is wound onto the second spool in a way such that a pull on the scriber will cause one spool to unwind cord while simultaneously the other spool winds up cord. Thus, with the two cords held taut, any position of the scriber is such that the sum of the distances from the scriber to $F_1$ and $F_2$ is constant and, therefore, the scriber traces an ellipse.

If a hyperbola is desired, the second cord is wound onto the second spool in such a way that a pull on the scriber will cause both spools to unwind cord. For drawing a hyperbola, it is advantageous to have the spools' spindles spring biased to keep the cords tightly wound onto their spools. Thus, with the two cords held taut by this spring biasing, any position of the scriber is such that the differences of the distances from the scriber to $F_1$ and $F_2$ is a constant and, therefore, the scriber traces a hyperbola.

The conicograph is particularly suitable for use on an overhead projector to teach fundamental mathematical concepts relating to the conic sections. Among these concepts is the idea of the eccentricity of a conic. Every student in a class of mathematics students can see that, as the eccentricity varies from zero, to less than one, to one, and then to greater than one, the conicograph draws first a circle, then an ellipse, then a parabola, and then a hyperbola. Also the first embodiment of the conicograph can dynamically and simultaneously illustrate two definitions of an ellipse and two definitions of a hyperbola.

References should be had to the accompanying drawings forming a part of this specification, in which.

Figure 3:
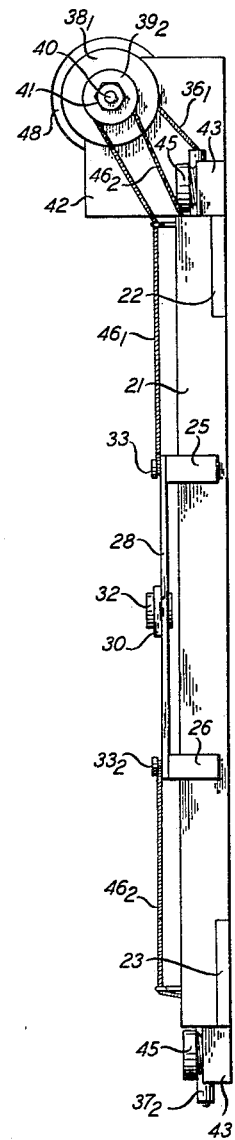
FIG. 3 is a side elevation of the first embodiment of the invention.
Figure 1:
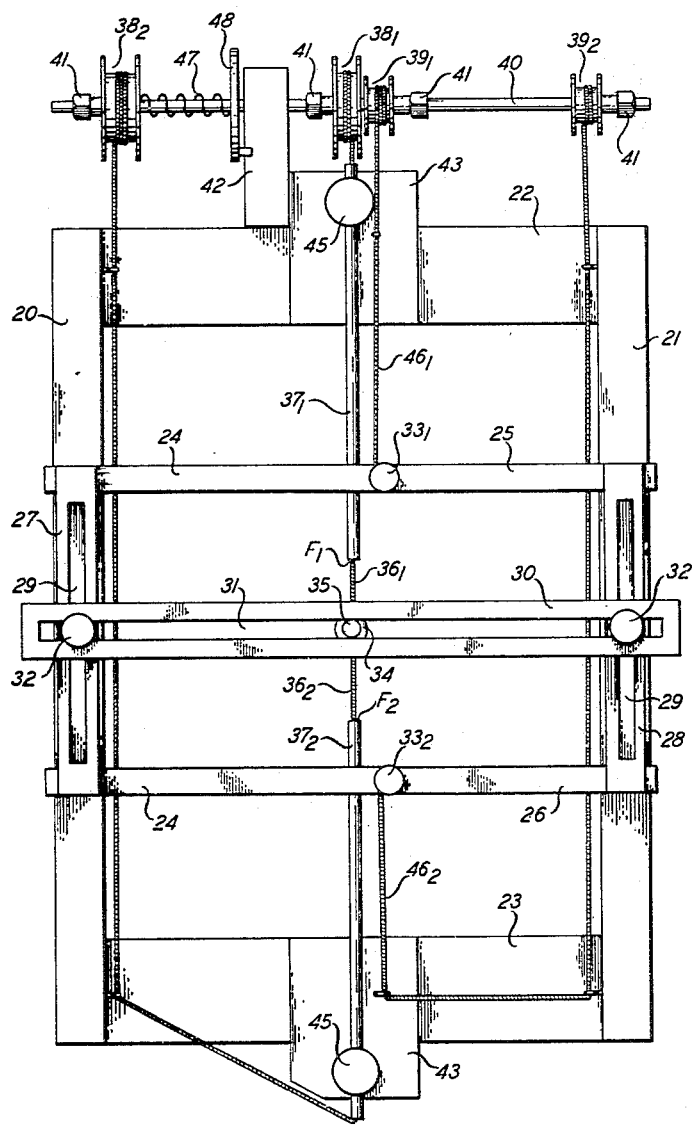
FIG. 1 is a top plan view of a first embodiment of the invention shown set up to draw a hyperbola utilizing both mentioned definitions.
Figure 2:
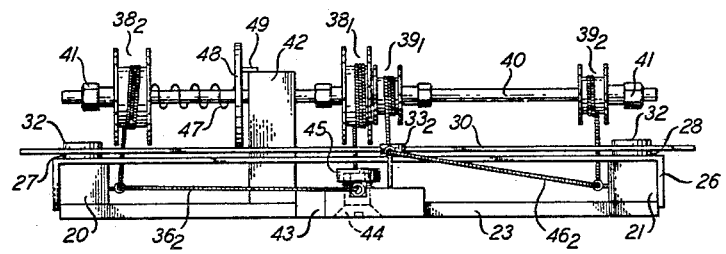
FIG. 2 is a front elevation of the first embodiment of the invention.
Figure 6:
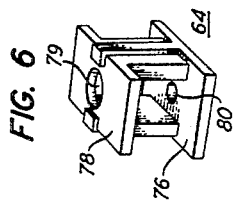
FIG. 6 is a perspective view of the scriber-holder of FIG. 4.
Figure 7:
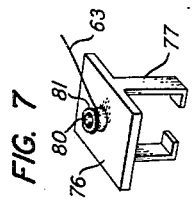
FIG. 7 is a perspective view of the base of the scriber-holder with the base shown removed and inverted thereby illustrating both the means for attaching the base to the scriber-holder and the means for attaching the focal cord to the scriber-holder.
Figure 5:
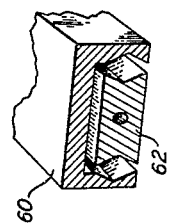
FIG. 5 is a partial perspective cross section along the line 5—5 of FIG. 4.

Referring to FIGS. 1, 2, and 3, there is a rectangular frame comprising a left rail 20, a right rail 21, and cross-members 22 and 23. Slidably mounted for sliding on left and right rails 20 and 21 there is rectangularly shaped slide 24 comprising cross-members 25 and 26 having their left and right ends bent at right angles for keeping cross-members 25 and 26 substantially perpendicular to left and right rails 20 and 21. Slide 24 also has left and right sides 27 and 28 each containing slot 29. Transverse bar 30 containing slot 31 is adjustably mounted to cross-members 27 and 28 by means of two knurled-nut-bolt combinations 32 wherein the bolt passes through slots 29 and 31 and the knurled-nut provides means for securely fastening transverse bar 30 at a predetermined angle with respect to cross-members 25 and 26 of slide 24. Cross-members 25 and 26 have mounted thereon cord-retainers $33_1$ and $33_2$. Scriber-holder 34 has central circular aperture 35 with diameter equal to the width of slot 31. Details are not shown but scriber-holder 34 is preferably constructed so that central circular aperture 35 is defined by a circular ring that is free to turn inside two outer rings that define the outer portion of scriber-holder 34.

Nearly nonstretchable focal cords $36_1$ and $36_2$ are securely but rotatably and removably fastened one to each of the outer rings of scriber-holder 34. Focal cords $36_1$ and $36_2$ run respectively to centrally located longitudinal bores in focus arms $37_1$ and $37_2$, through the bores, and through appropriate guides (eyelets or small pulleys) to spools $38_1$ and $38_2$. Spools $38_1$ and $38_2$, $39_1$ and $39_2$ are adjustably mounted on spindle 40 by means of tightening nuts 41. All spools 38 and 39 when tightened to spindle 40 turn simultaneously with spindle 40 but each spool can be loosened and turned on spindle 40 without turning spindle 40. Spindle 40 goes through an appropriate bearing in bearing mount 42 and bearing mount 42 is securely fastened to cross-member 22 of the rectangularly shaped frame.

In the position shown, spindle 40 is biased by coil spring 47 to turn in a counterclockwise sense thereby keeping focal cords $36_1$ and $36_2$ under sufficient tension so that scriber-holder 34 remains substantially in alignment with focus arms $37_1$ and $37_2$. Coil spring 47 is attached at one end to spindle 40 and at the other end to circular disc 48. Circular disc 48 is free to turn on spindle 40 and carries tab 49. Tab 49 rests on bearing mount 42 preventing spring 47 from unwinding unless spindle 40 turns. However, by pushing circular disc 48 to the left, tab 49 disengages from its rest on bearing mount 42 making it possible to either increase or decrease the spring pressure tending to rotate spindle 40. Also, it is possible to unwind spring 47 and leave it unwound or wind it up in the opposite direction.

Focus arms $37_1$ and $37_2$ may be of rectangular cross section and are adjustably mounted to cross-members 22 and 23 by means of slotted blocks 43, slotted bolts 44, and knurled nuts 45. By loosening knurled nuts 45, focus arms 37 can be slid longitudinally. Since the inner ends of focus arms 37 correspond to the foci of the desired conic, this adjustability of the focus arms 37 provides means for scribing conics with different distances between their foci.

Nearly nonstretchable cords $46_1$ and $46_2$ are securely but removably fastened to cord retainers $33_1$ and $33_2$, respectively, they then pass through appropriate guides to spools $39_1$ and $39_2$ respectively. The removably fastening of cords 46 to cord retainers 33 provides one means for adjusting the distance between the focus and the vertex of the conic section to be scribed.

Viewing the conicograph from the right, as in FIG. 3, turning spindle 40 clockwise will cause cords $36_1$, $36_2$, and $46_2$ to wind off their spools $38_1$, $39_2$, and $38_2$ while cord $46_1$ winds onto its spool $39_1$. A conic can be drawn by inserting a scriber (pen, pencil, felt-tipped marker, etc.) through slot 31 of transverse bar 30 and into the rotatable ring defining the central aperture 35 of scriber-holder 34. After inserting the scriber as described, a pull to the left or to the right on the scriber will cause cords $36_1$ and $36_2$ to turn their spools $38_1$ and $38_2$ clockwise and, thus, spindle 40 turns clockwise. This clockwise turn of spindle 40 will cause cord $46_1$ to be wound onto spool $39_1$, thereby pulling slide 24 towards the spools. Simultaneously, cord $46_2$ is wound off its spool. The ratio of the length of cord $36_1$ unwound from its spool to the length of cord $46_1$ wound onto its spool equals the ratio of the diameters of spools $38_1$ and $39_1$ and this constant ratio determines the eccentricity of the conic being drawn. The eccentricity of the conic will be the ratio of the diameters of spols $38_1$ and $39_1$ provided transverse bar 30 is parallel to cross-members 25 and 26 of slide 24. Otherwise, if $r$ is the ratio of the diameters of spools $38_1$ and $39_1$ and if $\theta$ is the acute angle between transverse bar 30 and cross-members 25 and 26, then the eccentricity of the conic will be $r \sec \theta$, as will be shown later.

Figure 4:
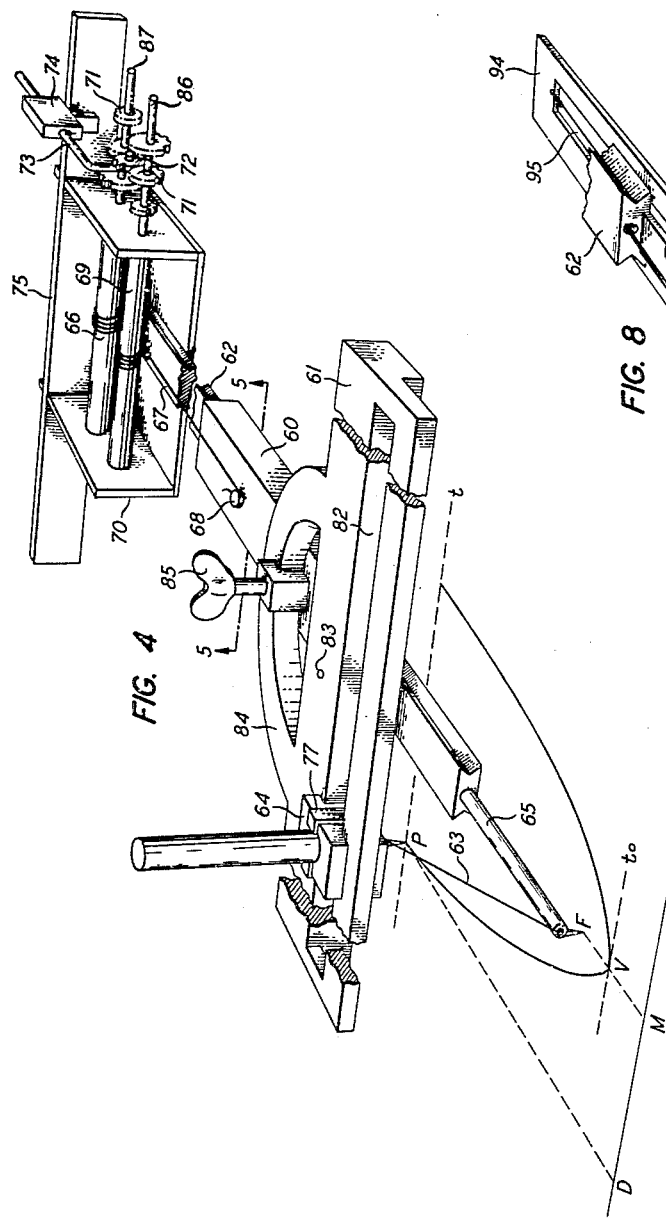
FIG. 4 is a perspective view (not necessarily to scale) of a second embodiment of the invention.

FIG. 4 shows a second embodiment of the invention wherein slide 60 carrying adjustable transverse bar 61 slides on center rail 62. Focal cord 63 is rotatably attached to scriber-holder 64 and runs to point F at the end of tubular extension 65 of center rail 62. From point F focal cord 63 runs through a centrally located longitudinal bore in center rail 62 and is removably attached to spool 66. Cord 67 is removably attached at one end to slide 60 by means of cord retained 68. Cord 67 is removably attached to spool 69. Spools 66 and 69 are splined to spindles 87 and 86 respectively, and these spindles turn in appropriate bearings mounted in framework 70. Framework 70 is securely attached to center rail 62. Spindles 86 and 87 extend through framework 70 and carry several appropriate gears 71. Gear 72 is carried by shaft 73 and shaft 73 is free to slide forward and backward in block 74. Block 74 is hinge mounted to slide 75. This mounting of gear 72 provides means for making gear 72 selectively engage a pair of gears 71 wherein one gear of the pair is securely fastened to spindle 87. Since the ratio of the diameters of gears 71 in one pair is different from the ratio in another pair, it is possible to change the ratio of the turns of spool 66 to the turns of spool 69 by moving gear 72 from engaging one pair of gears 71 to engaging another pair of gears 71.

Scriber-holder 64 consists of a base 76 removably attached by spring slips 77 to body 78. Body 78 has a central aperture 79 adapted to receive a scriber such as a pen, pencil, or felt tipped marker. Base 76 has aperture 80 aligned with aperture 79. This aperture 80 extends through a small notched cylindrical extension 81 on the underside of base 76. Small notched cylindrical extension 81 is adapted for rotatably fastening one end of focal cord 63 to base 76 and thereby to scriber-holder 64. Scriber-holder 64 is slidably mounted in slot 82 of transverse bar 61.

Transverse bar 61 is fastened to slide 60 by means of a single cylindrical rivet 83, a semi-circular portion 84, and set screw 85. By loosening set screw 85, transverse bare 61 can be turned on rivet 83 and fastened to make any desired angle between zero and nearly 90 degrees with respect to a line perpendicular to central rail 62. As with the first embodiment, the eccentricity of a conic can be adjusted by adjusting this angle.

The operation of this embodiment is similar to that of the first embodiment. For the position shown in FIG. 4, a forward pull on the scriber-holder will move transverse bar 61 forward causing cord 67 to unwind from spool 69 making this spool rotate clockwise. This clockwise rotation will be transmitted by gears 71 and 72 to spool 66 causing it to turn clockwise. Focal cord 63 is wound onto spool 66 in the opposite sense to that in which cord 67 is wound onto spool 69. Thus, as cord 67 winds off spool 69, cord 63 winds onto spool 66 thereby pulling the scriber-holder 64 toward point F. The point P of a scriber inserted in the scriber-holder will describe a conic whose focus is F, whose eccentricity is determined by the ratio of the diameters of gears 71 that are engaged by gear 72, and whose vertex, V, is on a line through F and perpendicular to transverse bar 61.

It is apparent that the eccentricity can be varied in two ways—by the selection of pairs of gears 71 and by adjusting transverse bar 61. The focus is completely variable since the apparatus can be freely moved about. Having set a particular eccentricity and selected a particular point for the point F, the distance between the focus F and the vertex V can be varied in two ways—by unfastening cord 67 from cord retainer 68 and refastening cord 67 at a new position and by disengaging gear 72 from gears 71 and moving transverse bar 61 and scriber-holder 64 so that the point of the scriber is at any desired point on the line through F and perpendicular to transverse bar 61 then turning spindles 86 and 87 until cords 67 and 63 are taut before engaging gear 72.

A complete ellipse and both branches of a hyperbola can be drawn by locating the second focus, $F_2$, and then turning the apparatus end-for-end and placing the point that was at F at the point $F_2$.

Figure 8:
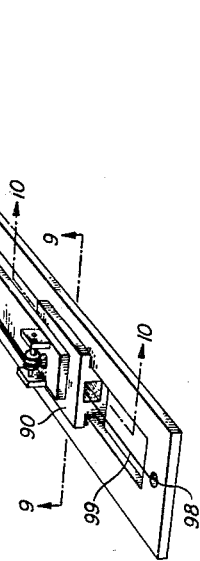
FIG. 8 is a perspective view (not necessarily to scale) of a rigid reinforcement for the flexible focal cord.
Figure 9:
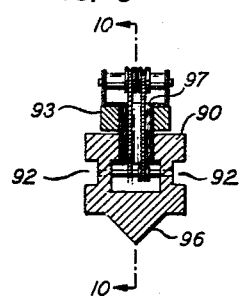
FIG. 9 is a front elevation along the line 9—9 of FIG. 8.
Figure 10:
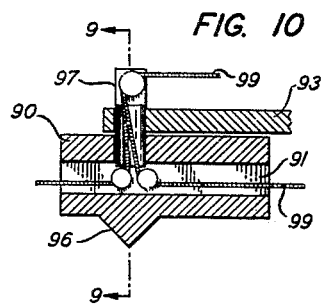
FIG. 10 is a side elevation along the line 10—10 of FIG. 8.

Although experimental models of the two embodiments described yield excellent conics, there may be times when the possible error introduced by the flexibility of focal cord 63 between point P and F cannot be tolerated. Therefore, a rigid reinforcement for the part of the focal cord between P and F is described. FIGS. 8, 9, and 10 illustrate this improvement.

A rotatable support 90 contains a longitudinal rectangular aperture 91 and longitudinal indents 92 is pivotally mounted by hollow pivot pin 97 on an extension 93 of central rail 62. Support 90 also has point 96 that corresponds to point F of FIG. 4. Support 90 turns about an axis that passes through point 96 and hollow pivot pin 97. Slide 94 containing slot 95 is adapted to slide in indents 92 of support 90. Slide 94 rotates with support 90 and goes underneath central rail 62. Slide 94 contains aperture 98 that is adapted to rotatably engage the small notched cylindrical extension 81 on the underside of base 76 of scriber-holder 64. Cord 99 is attached at one end to slide 94 near aperture 98. Cord 99 passes under a pulley, through hollow pivot pin 97 (see FIG. 10), over another pulley, through centrally located longitudinal bore of central rail 62 to spool 66. After making a few turns completely around spool 66, cord 99 runs through the centrally located bore of center rail 62, over a pulley, through hollow pivot pin 97, under another pulley, and then cord 99 is attached at its other end to a spring that in turn is adjustably attached to the rear portion of slide 94.

It can be appreciated that the conicograph operates with slide 94 just as it did without it except that now there is a rigid connector between points P and F. Furthermore, due to the double run of cord 99, any movement of slide 94 with respect to its support 90 will cause cord 99 to turn spool 66 whereas without such a double run of cord (such as with cord 63, FIG. 4), the cord causes spindle 66 to turn only when point P is moving away from point F.

Cord 67, FIG. 4, can be replaced with an endless cord in such a way that any movement of slide 60 with respect to central rail 62 will cause spindle 69 to turn. To accomplish this, a small pulley is mounted near the end of central rail 62 remote from spindle 69. This endless cord has a plurality of turns around spindle 69, runs underneath slide 60 and above central rail 62, around the beforementioned pulley and back to spindle 69. Either run of this cord can be adjustably attached to slide 60 preferably near the end of slide 60 nearest to spindle 69.

To make the conicograph a substantially better device for teaching the principles of conic sections, graduated scales can be added. Such scales would preferably be made of transparent material and be attached to the scriber-holder and to the transverse bar. The scales would be so fashioned as to indicate, for any position of the scriber-holder, the distances to the foci and to the directrix. Thus, these scales would clearly indicate the constant eccentricity or the constant sum or difference of distances. In the event that the conicograph is set to draw a conic utilizing two definitions, the scales would show simultaneously the constant eccentricity and the constant sum or difference.

In the two embodiments described, the scriber-holder is disposed either beneath a slot in the transverse bar or in this slot. This is a preferred disposition of the scriber-holder but is not a necessary disposition. Referring to FIG. 4, let focal cord 63 be disconnected from small notched clyindrical extension 81 of base 76 of scriber-holder 64. Tie a small loop in the end of cord 63. This small loop becomes the scriber-holder. The point of a scriber can be inserted in the loop without the scriber going through slot 82 of transverse bar 61. A conic is drawn by letting the scriber slide along the forward edge of transverse bar 61 as the scriber pulls cord 63 off spool 66. By holding the transverse bar so it cannot move, the scriber can be moved in an arc of a circle centered at F. Each end of such an arc will be at a point on the conic that would be drawn by allowing the transverse bar to move.

Figure 11:
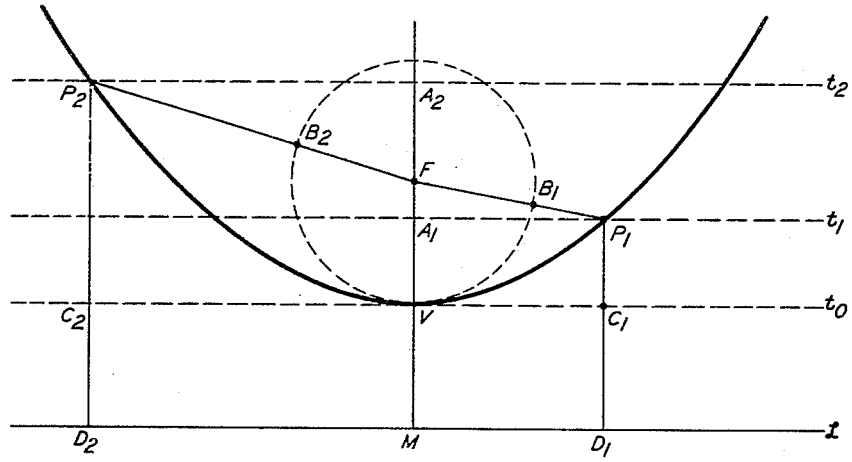
FIG. 11 is a diagrammatic view illustrating the principle of the invention.

FIG. 11 diagrammatically illustrates how the invention utilizes the eccentricity definition of a conic to draw a conic. With transverse bar 61 adjusted to be perpendicular to center rail 62, let line $t_0$ represent the longitudinal center of slot 82 when transverse bar 61 is in its original or beginning position. Let V be a point immediately below the center of the circular aperture 79 of scriber-holder 64 in its original position. Locate a line L parallel to $t_0$ and at a distance from point V such that the ratio $FV/VM$ is $r$ where $r$ is the ratio of the diameters of gears 71 that are engaged by gear 72. Insert a scriber into aperture 79 and pull the scriber to the right until the point $P_1$ is reached. This motion of the scriber will cause a length of cord equal to $B_1P_1$ to unwind from spool 66 while simultaneously winding a length of cord equal to $C_1P_1$ onto spool 69. Because the ratio of these lengths of cords is equal to the ratio of the diameters of gears 71 that are engaged by gear 72, $B_1P_1/C_1P_1=r$. From FIG. 11, it is apparent that $FB_1=FV$ and $D_1C_1=VM$. Thus, $FB_1/D_1C_1=r$. A theorem in algebra states: In a series of equal ratios the sum of all the numerators is to the sum of all the denominators as any one numerator is to its denominator. Thus, it follows that $$\frac{FB_1+B_1P_1}{D_1C_1+C_1P_1}=r=\frac{FP_1}{D_1P_1}$$

If the scriber is pulled to the left until the point $P_2$ is reached, it follows, in the same manner, that $FP_2/D_2P_2=r$. In fact, any point P reached by the scriber is such that $FP/PD=r$ and this, of course, satisfies the eccentricity definition of a conic; if $r<1$, the conic is an ellipse, if $r=1$, the conic is a parabola, and if $r>1$, the conic is a hyperbola.

If, when the scriber is at V, the spools are prevented from turning, then $B_1P_1$ equals zero and, in effect, $r=0$. In this case, the conicograph will draw part of a circle with center F and with radius FV.

Figure 12:
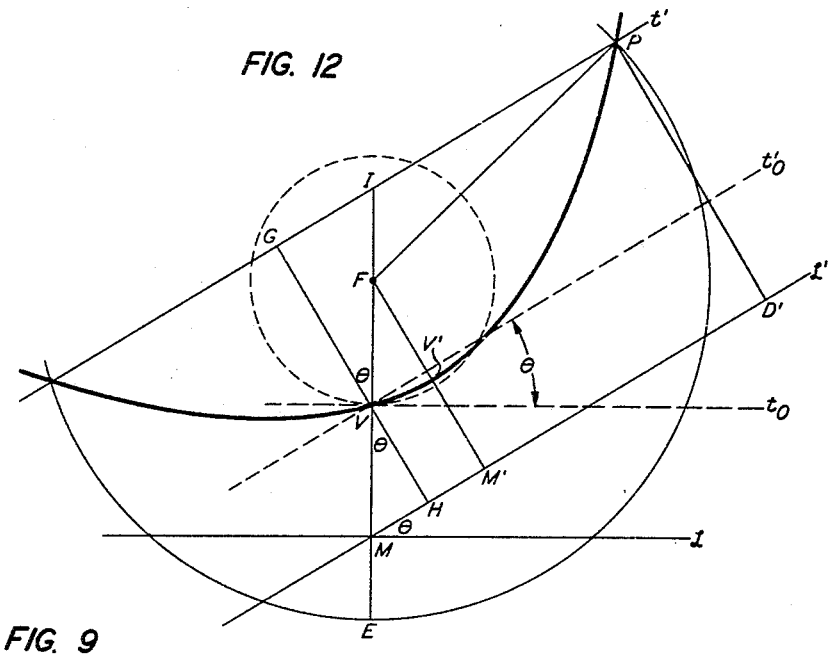
FIG. 12 is a diagrammatic view illustrating the principle used to obtain eccentricities intermediate the eccentricities provided by the ratios of diameters of gears.

FIG. 12 diagrammatically illustrates the principle used to obtain eccentricities intermediate the eccentricities provided by ratios of diameters of gears 71. The points and lines F, V, M, $t_0$, and L are located as decribed for FIG. 11. Transverse bar 61 is adjusted to make an angle $\theta$ with line $t_0$. The line $t_0'$ represents, for the beginning position of bar 61, the longitudinal center of slot 82 of transverse bar 61. L' is a line through M and parallel to $t_0'$. Further, L' is the directrix of the conic whose vertex V', is on the line through F and perpendicular to L' and whose eccentricity is $r \sec \theta$, as the following discussion shows.

As before, $FV/VM=r$. As the scriber is pulled to the right reaching point P, a length of cord equal to VE unwinds from spool 66 while a length of cord equal to VI winds onto spool 69. Thus, $VE/VI=r$. But $VM=HV \sec \theta$ and $VI=VG \sec \theta$. Thus $$\frac{FV}{HV \sec \theta}=r=\frac{VE}{VG \sec \theta}$$

It follows readily that $FP/PD'=r \sec \theta$ and this relationship holds for any point P reached by the scriber. Thus, the figure drawn by the scriber is a conic with eccentricity $r \sec \theta$ and directrix L' as described above.

The first embodiment of the conicograph (see FIGS. 1, 2, and 3) can be used to draw an ellipse or a hyperbola from the sum or difference of distances point of view. For this point of view, slide 24 is not needed. Therefore, let cords $46_1$, $46_2$ and slide 24 be removed. Scriber holder 34 is located between focus arms $37_1$ and $37_2$ but is not centered between them. Let the center of the central aperture 35 be V, let the innermost ends of focus arms $37_1$ and $37_2$ be $F_1$ and $F_2$, respectively. Suppose $VF_2$ is greater than $VF_1$ and thus, $VF_2-VF_1$ is some positive number. Placing a scriber in the scriber-holder and pulling it to the right or left against the spring tension furnished by coil spring 47 will cause equal lengths of cords $36_1$ and $36_2$ to unwind off spools $38_1$ and $38_2$. Thus, for any point P reached by the scriber, $PF_2-PF_1$ will equal the same positive number that $VF_2-VF_1$ equals. By definition, the locus of all such points P is a hyperbola.

An ellipse can be drawn by winding cords $36_1$ and $36_2$ onto their spools in opposite directions. Since these cords are wound in opposite directions, coil spring 47 is not needed and is therefore disengaged. Focus arms $37_1$ and $37_2$ are adjusted so that their innermost ends are at the desired foci, $F_1$ and $F_2$. One of the spools $38_1$ and $38_2$ is loosened from spindle 40. By turning the spools it is possible to set the conicograph to draw an ellipse with any desired semi-minor axis less than one-half the distance between left and right rails 20 and 21. Suppose $b$ is the desired semi-minor axis, then the spools are adjusted so that, with focal cords $36_1$ and $36_2$ under slight tension, and with the center V of scribed-holder 34 above a point U on the line that is the perpendicular bisector of $F_1F_2$, the distance from U to $F_1F_2$ is $b$. The sum of the distances $UF_1$ and $UF_2$ is some positive number. If the spools are now tightened to spindle 40 and the scriber-holder is moved away from point U keeping the focal cords under tension, then as focal cord $36_1$ unwinds from its spool, focal cord $36_2$ will wind onto its spool. Thus, for any point P reached by the scriber-holder, $PF_1+PF_2$ will equal the same positive number that $UF_1+UF_2$ equals. By definition, the set of all such points P is an ellipse.

To set the conicograph to draw a hyperbola utilizing both definitions of a hyperbola, it is necessary to adjust carefully the distance between the innermost ends of the focus arms and the distance between the end of one focus arm and the center-point of the scriber-holder. If the ratio of the diameters of spools $38_1$ and $39_1$ is $r$ (and the ratio of the diameters of spools $38_2$ and $39_2$ is also $r$), then the distance between $F_1$ and $F_2$ (that is, the distance between the innermost ends of the focus arms) must be set at $2r$ units (any desired unit) and the distance between V and $F_1$ (that is, the distance between the innermost end of focus arm $37_1$ and the center of the scriber-holder) must be set at $(r-1)$ units.

Similarly, to set the conicograph to draw an ellipse utilizing both definitions, set the distance between $F_1$ and $F_2$ to be $2r$ units and set the distance between V and $F_1$ to be $(1-r)$ units. For an ellipse, $V_1$ and $V_2$, the vertices, fall underneath the focus arms. Therefore, the distance $(1-r)$ units cannot be easily set. However, the length of the semi-minor axis (the distance from the center of the ellipse to a minor vertex) is $\sqrt{1-r^2}$ units. Therefore, after setting $F_1F_2$ equal to $2r$, construct the perpendicular bisector of $F_1F_2$ and on this bisector locate a point U that is $\sqrt{1-r^2}$ units from the midpoint of $F_1F_2$. Then set the conicograph so that the center of the scriber-holder is above the point U.

Thus, by knowing the ratio, $r$, of the diameters of spools $38_1$ and $39_1$, and by choosing any desired distance as a unit, the conicograph can be adjusted to draw either a hyperbola or an ellipse while simultaneously utilizing both definitions.

It is to be understood that variations and modifications of the specific devices herein shown and described for purposes of illustration may be made without departing from the spirit and scope of the invention.

What is claimed is:
1. A conic section scriber comprising:
   a fixed first member;
   a second member slidably mounted on the first member for movement only along a first line;
   a scribing means slidably mounted on the second member for movement relative to the second member only along a second line;
   motion transmitting means connecting the scribing means and the second member;
   means comprising the motion transmitting means for maintaining a predetermined relation between the distance moved by the scribing means along the second line and the distance moved by the second member along the first line, whereby the scribing means traces a predetermined curve; and
   the motion transmitting means comprising a first cord connected to the second member and being wound at the other end about a first spool, a second cord being connected to the scribing means and being wound about a second spool, and means for causing the second cord to wind about the second spool at a rate which is a predetermined ratio of the rate of winding of the first cord about the first spool.

2. The scriber of claim 1 wherein:
the first and second spools are mounted on separate axles;
and the means for causing rotation comprises a gear train for coupling the axles.

3. The scriber of claim 1 wherein:
the first and second spools are mounted on a common axis but have different diameters.

4. The scriber of claim 1 further comprising:
means for constraining a first part of the second cord to lie on a straight line extending from the second spool in the direction of the first line to a first fixed point.

5. The scriber of claim 4 further comprising:
means for constraining a second part of the second cord to lie on a second fixed point that is on the first line, the second cord extending from the second spool to the first fixed point, thence to the scribing means and thence to the second fixed point.

6. The scriber of claim 5 further comprising:
means for winding said second part of the second cord at the same rate as the second spool; and wherein:
the said second part of the second cord extends from the second fixed point to said winding means.

7. A conic section scriber comprising:
a fixed first member;
a second member slidably mounted on the first member for movement only along a first line;
a scribing means slidably mounted on the second member for movement relative to the second member only along a second line;
motion transmitting means connecting the scribing means and the second member;
means comprising the motion transmitting means for maintaining a predetermined relation between the distance moved by the scribing means along the second line and the distance moved by the second member along the first line, whereby the scribing means traces a predetermined curve; and
means for adjusting the orientation of the second member relative to the fixed first member to adjust the direction of the second line, thereby adjusting the eccentricity of any curve which is traced.

8. A conic section scriber comprising:
a fixed suport;
a first slide mounted for linear movement on the fixed support;
a bar mounted on said slide and normally disposed transversely to the line of travel of said slide;
a second support mounted on the fixed support and free to turn about a fixed axis;
a second slide mounted for linear movement on the second support;
scribing means slidably connected to said bar and rotatably connected to the second slide; and
motion transmitting means connecting said slides and said supports and controlled by the linear movement of one with respect to its support for maintaining a predetermined fixed ratio between the linear movements of the slides with respect to their supports.

9. The scriber of claim 8 further comprising:
means for adjusting said bar angularly with respect to the line of travel of said first slide.

References Cited

UNITED STATES PATENTS 2,700,221   1/1955   Rovner.
3,311,981   4/1967   Poslusny.

FOREIGN PATENTS 176,676   3/1922   Great Britain.

HARRY N. HAROIAN, Primary Examiner